United States Patent
Watanabe

(12) 
(10) Patent No.: US 6,483,670 B1
(45) Date of Patent: Nov. 19, 2002

(54) HEAD ASSEMBLY HAVING AN APERTURED REINFORCING PLATE COOPERATIVELY ATTACHED TO A LOAD BEAM TO PREVENT EXCESSIVE MOVEMENT OF COMPONENTS OF THE HEAD ASSEMBLY

(75) Inventor: Toru Watanabe, Sagamihara (JP)

(73) Assignee: Fujitsu Limited, Kawasaki (JP)

( * ) Notice: Subject to any disclaimer, the term of this patent is extended or adjusted under 35 U.S.C. 154(b) by 111 days.

(21) Appl. No.: 09/614,839

(22) Filed: Jul. 12, 2000

(30) Foreign Application Priority Data

Nov. 15, 1999 (JP) .......................................... 11-324004

(51) Int. Cl.[7] ................................................ G11B 5/55
(52) U.S. Cl. ................................................... 360/245.7
(58) Field of Search .......................... 360/245.5, 245.7

(56) References Cited

U.S. PATENT DOCUMENTS

| | | | | |
|---|---|---|---|---|
| 4,724,500 A | * | 2/1988 | Dalziel | ..................... 360/245.7 |
| 5,793,569 A | | 8/1998 | Christianson et al. | |
| 5,875,071 A | | 2/1999 | Erpelding et al. | |
| 5,987,733 A | * | 11/1999 | Goss | ....................... 360/245.7 |

* cited by examiner

Primary Examiner—A. J. Heinz
(74) Attorney, Agent, or Firm—Greer, Burns & Crain, Ltd.

(57) ABSTRACT

A head suspension includes a planar load beam, and a gimbal extending from, and formed integrally with the load beam. The gimbal has a slider loader on which a head slider is adapted to be attached. Also included in the head suspension is a reinforcing plate cooperatively attached to the load beam.

12 Claims, 3 Drawing Sheets

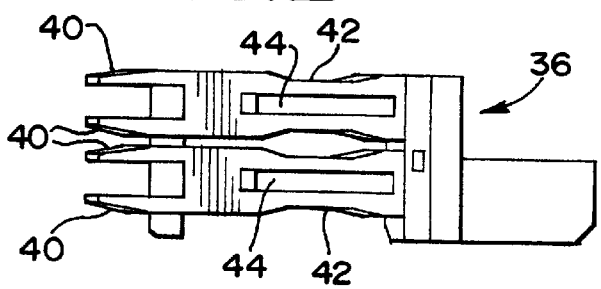
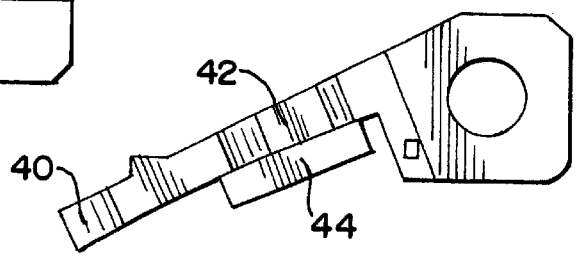
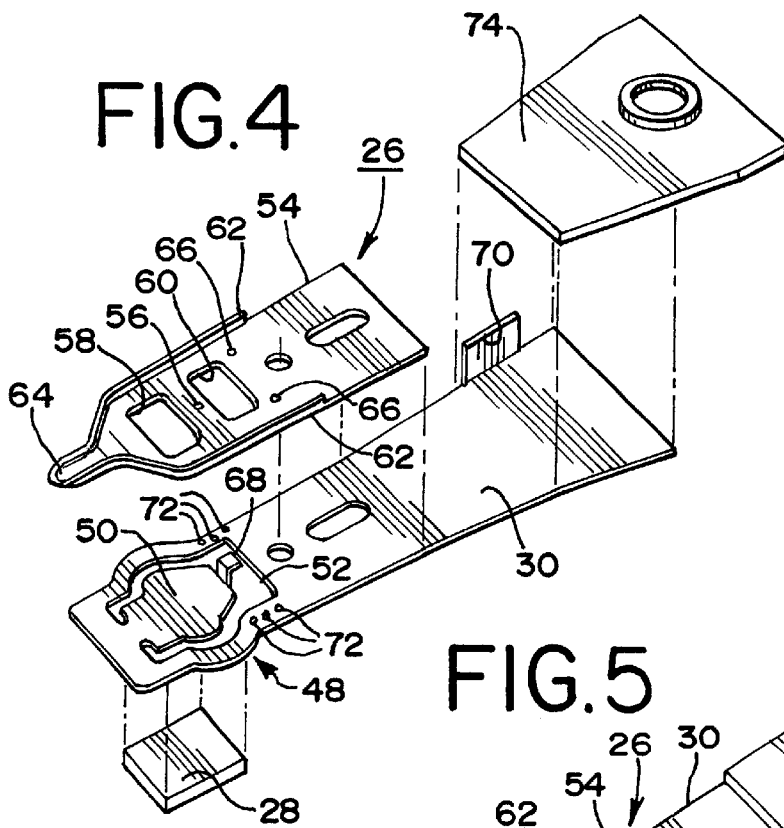
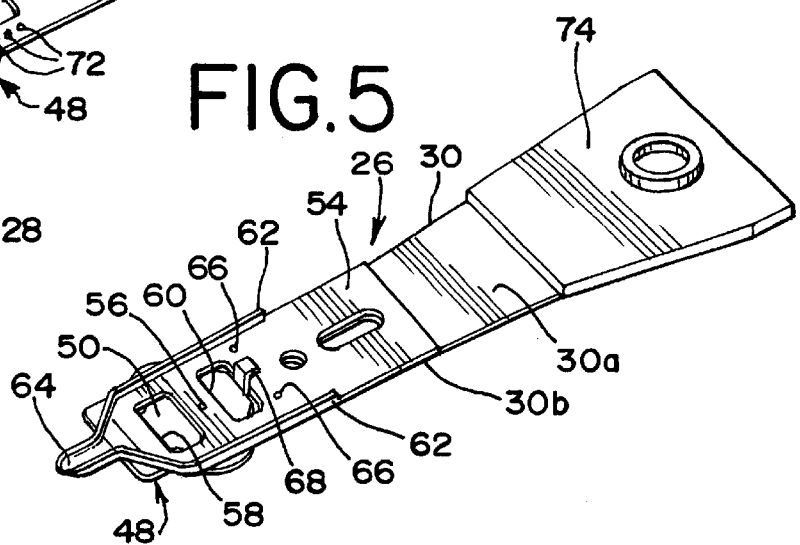

HEAD ASSEMBLY HAVING AN APERTURED REINFORCING PLATE COOPERATIVELY ATTACHED TO A LOAD BEAM TO PREVENT EXCESSIVE MOVEMENT OF COMPONENTS OF THE HEAD ASSEMBLY

The present invention relates to a magnetic disk apparatus, and particularly to a head suspension and a head assembly used therein.

BACKGROUND OF THE INVENTION

Recently, to reduce the size and increase the recording density of magnetic disk apparatus, the "flying height" of a head slider over a recording medium has been decreased to an extremely low height, or contact recording and reproduction have been implemented so that the slider remains in contact with the recording medium. The head assembly used in the magnetic disk apparatus requires a gimbal having low rigidity to enable the magnetic head slider to track even in the presence of installation errors of the head assembly or undulations of the magnetic disk, and a suspension or load beam having high resonant frequency in the seek direction, i.e., in the radial direction of the disk, for highly accurate positioning.

Portable personal computers such as notebook computers must have strong shock resistance because they are often carried. Thus, the magnetic disk apparatus for these computers are equipped with a loading and unloading scheme to unload the head slider from the disk surface when the power is off or when the computers go into a sleep mode, and to load the head slider onto the disk surface when in use. Typically, a magnetic disk apparatus equipped with the loading/unloading scheme raises a rectangular tip installed on the front end of the magnetic head assembly onto the ramp inclined portion of a ramp component provided on the outer periphery of the disk medium when the computer power is off or the computer is in a sleep mode, thereby separating the magnetic head slider from the magnetic disk. In this manner, the magnetic head slider can be prevented from hitting and damaging the magnetic disk when the computer receives a shock.

A known gimbal structure which satisfies the demand for low gimbal rigidity and high resonant frequency in the seek direction, supports a head slider on a pivot point. The gimbal is fixed by spot welding to the tip of a load beam, and the magnetic head slider is loaded onto the gimbal. A pair of ribs are formed integrally on both sides of the load beam to increase rigidity. A rectangular tip to be raised onto the ramp component and unload the magnetic head slider from the magnetic disk is formed integrally at the tip of the load beam. The known load beam and gimbal are generally formed from stainless steel. The plate thickness of the load beam is about 43 μm, and that of the gimbal is about 20 μm.

To achieve higher recording density, faster speed, and higher reliability for magnetic disk apparatus, gimbal rigidity must be reduced to stabilize the flying of the magnetic head slider in the magnetic head assembly, and the load beam must have high resonant frequency in the seek direction, i.e., in the radial direction of the magnetic disk. Furthermore, the resilient part of the load beam must have a low spring constant to reduce load fluctuations. There must be at least four printed wires for signal lines when a magnetoresistance effect head (MR head) and a loading/unloading scheme are adopted.

Resonance in the seek direction is normally accompanied by torsion. Thus, at the same time the rigidity in the seek direction is increased, the torsional rigidity must also be increased. A conventional load beam having ribs formed on the rigid part of the load beam has increased flexural rigidity, but the torsional rigidity is not sufficiently high and no different from a flat plate. When the plate thickness of the entire load beam is increased to raise the torsional rigidity, the accompanying increase in mass does not result in an equivalent contribution to an increase in the resonant frequency of the load beam. The increase in the mass of the head assembly also induces a drop in the reliability of the shock resistance.

To stably fly the magnetic head slider over a disk, the gimbal rigidity and the spring constant of the resilient part of the load beam must be decreased and the variations in the load must be minimized. If a load beam has the same thickness as the gimbal, the load beam can be made more rigid by a strategy such as thickening the plate of the load beam. However, lowering the spring constant requires opening a hole in the resilient part of the load beam. If a hole is opened in the resilient part of the load beam, the torsional rigidity of the resilient part is lost, and the resonant frequency drops. The spring constant of the load beam can also be lowered by thinning the resilient part by half etching, but obtaining the desired thickness is difficult.

Low flying sliders used recently in some computers are mostly negative pressure sliders. Therefore, when the slider is unloaded from the top of the magnetic disk, the slider tends to stick to the surface of the magnetic disk. Forcibly pulling offthe slider deforms the gimbal.

Accordingly, one object of this invention is to provide an improved head assembly which enables high recording density at faster speeds.

Another object of this invention is to provide an improved head assembly having a gimbal with low rigidity and a load beam having high resonant frequency in the radial direction of a magnetic disk.

Still another object of this invention is to provide an improved head assembly having a reinforcing plate attached to the load beam.

Yet another object of this invention is to provide an improved head assembly having a gimbal which is not prone to deformation when a slider is unloaded from a disk surface.

Further object of this invention is to provide an improved head assembly having a hook formed on a gimbal to prevent the gimbal from deforming when the slider is unloaded from a disk surface.

SUMMARY OF THE INVENTION

In keeping with one aspect of this invention, a head suspension includes a substantially planar load beam, a gimbal extending from and formed integrally with the load beam. The gimbal has a slider loader on which a head slider is adapted to be attached. Also included in the head suspension is a substantially rigid reinforcing plate cooperatively attached to the load beam.

A head assembly of this invention includes a substantially planar load beam, a gimbal extending from and formed integrally with the load beam. The gimbal has a slider loader. A reinforcing plate is cooperatively attached to the load beam and a head slider is fixedly attached to the slider loader.

A disk apparatus of this invention includes a housing, a head assembly provided in the housing and having a head element for reading and writing data on a disk having a plurality of tracks, and an actuator for moving the head assembly over the tracks. The head assembly further includes a substantially planar load beam, and a gimbal extending from and formed integrally with the load beam and having a slider loader. A reinforcing plate is cooperatively attached to the load beam, and a head slider having the head element is fixedly attached to the slider loader.

Another aspect of a disk apparatus of this invention includes a housing with a base, a head slider having a head element for reading and writing data on a disk having a plurality of tracks, and an actuator having an actuator arm rotatably fixed on the base for moving the head slider over the tracks of the disk. A controller moves the actuator for loading and unloading the head slider on and from the disk. A ramp component is fixed to the base for slidably receiving the head slider when the head slider is unloaded from the disk. Also, a head assembly is mounted on a tip of the actuator arm. The head assembly includes a substantially planar load beam, a gimbal extending from and formed integrally with the load beam and having a slider loader on which the head slider is fixedly attached, and a reinforcing plate cooperatively attached to the load beam.

BRIEF DESCRIPTION OF THE DRAWINGS

The above-mentioned and other features of this invention and the manner of obtaining them will become more apparent, and will be best understood by reference to the following description, taken in conjunction with the accompanying drawings in which:

FIG. 2 is a side view of a ramp component;

FIG. 3 is a top view of the ramp component of FIG. 2.

FIG. 4 is an exploded perspective view of a head assembly of the present invention;

FIG. 5 is an assembled perspective view of the head assembly of FIG. 4;

DETAILED DESCRIPTION

Figure 1:
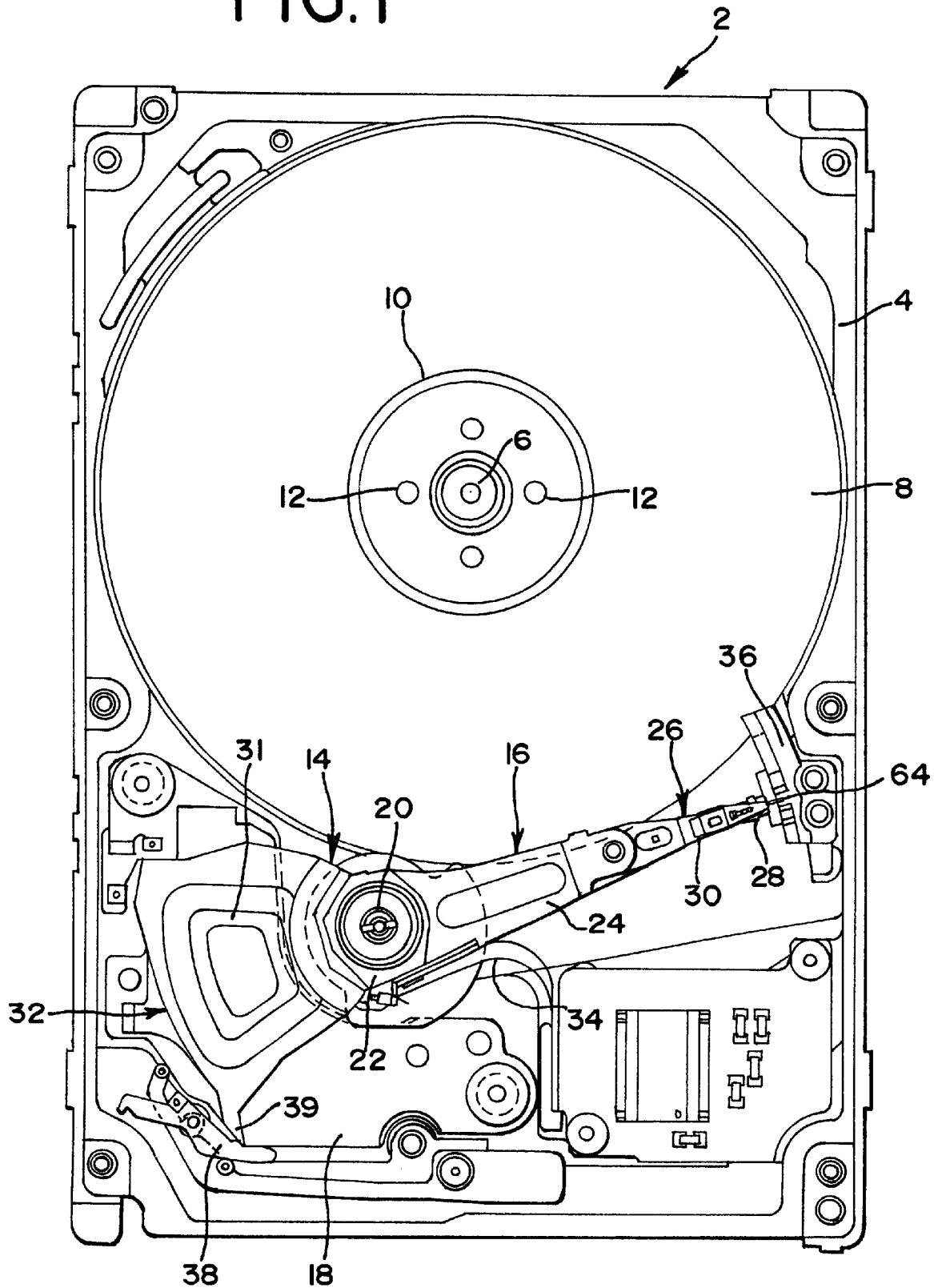
FIG. 1 is a plan view of a magnetic disk apparatus of the invention, with the cover removed for clarity.

As seen in FIG. 1, the magnetic disk apparatus 1 of the present invention includes a housing 2 which is constructed from a base 4 and a cover (not shown) fixed to the base. A shaft 6 is fixed to the base 4, and a spindle hub (not shown) is provided around the shaft 6. Multiple magnetic disks 8 (one shown) are mounted on the spindle hub at fixed intervals by alternately inserting magnetic disks and spacers (not shown) onto the spindle hub and fastening a disk clamp 10 to the spindle hub by a plurality of screws 12.

A rotary actuator 14 provided in the disk apparatus 1 includes an actuator arm assembly 16 and a magnetic circuit 18. The actuator arm assembly 16 includes an actuator block 22 installed to allow the arm assembly to rotate about the shaft 20 via a pair of bearings, a plurality of actuator arms 24 (one shown) elongated in one direction from the actuator block 22, and a head assembly 26 fixed to the tip of each actuator arm 24.

Each head assembly 26 includes a head slider 28 that has a magnetic head element (not shown) for reading and writing data on the magnetic disk 8, and a load beam 30 that supports the head slider 28 at its front end and is fixed to the actuator arm 24 at its base end.

A coil 31 is supported on the side opposite the actuator arm 24 with respect to the shaft 20, and is inserted into the gap in the magnetic circuit 18 to construct a voice coil motor (VCM) 32. A flexible printed circuit board (FPC) 34 supplies write signals to and receives read signals from the magnetic head element. One end of the FPC 34 is fixed to the side surface of the actuator block 22. A ramp component 36 is provided adjacent to the outer periphery of the magnetic disk 8 and is fixed to the base 4.

As shown in FIGS. 2 and 3, the ramp component 36 has a plurality of ramps or inclined sections 40 which correspond to the number of head sliders 28, and a plurality of parking sections 42 that stably park rectangular tips 64 formed at the front end of the head assembly 26 (one shown in FIG. 4). Projections 44 are formed on the side surface of the ramp component 36 to prevent interference between the head sliders 28. A latch mechanism 38 is provided to latch a projection 39 of the actuator 14 in the unloaded state (shown in FIG. 1). The state shown FIG. 1 is the unloaded state where the head sliders 28 are unloaded from the top of the magnetic disks 8. In the unloaded state, the rectangular tips 64 of the head assembly 26 are parked in the parking sections 42 of the ramp component 36, and the projection 39 of the actuator 14 is latched by the latch mechanism 38.

When power is applied to the computer or when the computer is released from a sleep mode, the latch mechanism 38 is released first. Then, the actuator 14 is rotated in the counterclockwise direction. The rectangular tips 64 slides down the ramps 40 to load the head sliders 28 onto the magnetic disks 8. When the power to the computer is turned off or when it enters the sleep mode, control means, such as an MPU, mounted on the main printed circuit board of the magnetic disk apparatus controls the actuator 14, so that each head slider 28 is rotated to go outside of the outer periphery of the magnetic disks 8. As a result, the rectangular tips 64 of the head assembly 26 run up the ramps 40 of the ramp component 36 and are parked at the parking sections 42. In this state, the projection 39 of the actuator 14 is also latched by the latch mechanism 38.

The head assembly 26 of the embodiment of the present invention is now described in detail with reference to FIGS. 4–10. Referring to FIG. 4, a gimbal 48 is formed integrally with a load beam 30 in a head assembly 26. A generally U-shaped slit 52 formed in the front end of the load beam 30 outlines a slider loader 50, to which the head slider 28 is attached. The slider loader 50 includes a hook 68 which is adapted and configured to latch onto the load beam 30 and prevents the slider loader 50 from permanently bending when the head slider 28 is pulled off the surface of the disk 8 and unloaded (best shown in FIG. 5).

As shown in FIG. 5, the load beam 30 includes a resilient part 30a and a rigid part 30b to press the head slider 28 against the magnetic disk 8. The load beam 30 is formed from stainless steel and preferably has a thickness of approximately 22 mm. A reinforcing plate 54 is attached to the load beam 30 by spot welding to the rigid part 30b. The reinforcing plate 54 is preferably formed from stainless steel, for instance, to a thickness about 1.0 to 2.0 times, preferably, about 1.3 to 1.5 times, the thickness of the load beam 30. The most preferred thickness for the reinforcing plate 54 is about 30 $\mu$m when the load beam 30 is about 22

μm thick. When the thickness of the reinforcing plate 54 is within this range, the resonant frequency of the head assembly 26 can be increased and the increase in mass kept to a minimum. If the thickness of the reinforcing plate 54 is less than the thickness of the load beam 30, the rigidity of the rigid part 30b decreases and the resonant frequency drops. Conversely, if the thickness of the reinforcing plate 54 is at least twice the thickness of the load beam 30, the shock acceleration necessary to separate the magnetic head slider 28 from the disk 8 becomes small in relation to the increase in mass and leads to poorer shock resistance.

The load beam 30 is generally planar, but in practical applications, the resilient part 30a is bent slightly into an arc to push the magnetic head slider 28 against the magnetic disk 8. The reinforcing plate 54 has a pivot 56 projecting downwardly (best shown in FIGS. 4 and 10). The tip of the pivot 56 is adapted and configured to press against the back surface of the slider loader 50 of the gimbal 48, and thereby supporting and applying a load force to the head slider 28.

A first opening 58 and a second opening 60 are preferably formed adjacent to the pivot 56 in the lengthwise direction of the reinforcing plate 54 (best shown in FIGS. 4 and 5). The first opening 58 has a larger area than the second opening 60. The first and second openings 58, 60 are formed adjacent to the pivot 56 so that the back surface of the slider loader 50 is partially visible through these openings (best shown in FIG. 5). Alternatively, Three or more openings can be formed to support the back surface of the slider loader 50.

Figure 7:
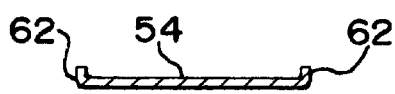
FIG. 7 is a sectional view along line 7—7 shown in FIG. 6.
Figure 8:
FIG. 8 is a sectional view along line 8—8 shown in FIG. 6.

To increase the rigidity of the reinforcing plate 54, a pair of ribs 62 are formed integrally on both sides of the reinforcing plate 54 (best shown in FIGS. 4 and 7). The ribs 62 and the relative thickness of the plate 54 allows the reinforcing plate to have a relatively large first and second openings 58, 60, which improve workability when the load beam 30 is joined to the reinforcing plate. It should be noted that if the second opening 60 is too narrow, the hook 68 formed on the slider loader 50 can interfere with the reinforcing plate 54 when the load beam 30 is joined to the reinforcing plate 54, and may become deformed.

Figure 9:
FIG. 9 is a sectional view along line 9—9 shown in FIG. 6.
Figure 10:
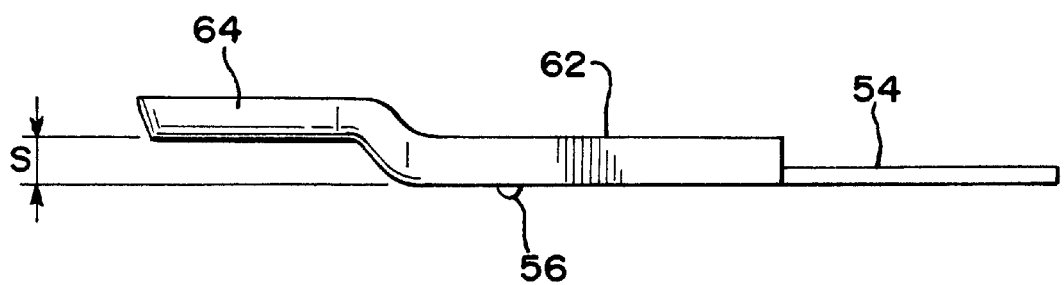
FIG. 10 is a side view of the reinforcing plate of FIG. 6.

A rectangular tip 64 is formed integrally on the front end of the reinforcing plate 54 and is seamlessly connected to the pair of ribs 62 (best shown in FIGS. 4 and 10). It should be understood that the cross-sectional shape of the rectangular tip 64 is not limited to the semicircular shape as shown in FIG. 9, but can also be U or V shaped, for example.

Figure 6:
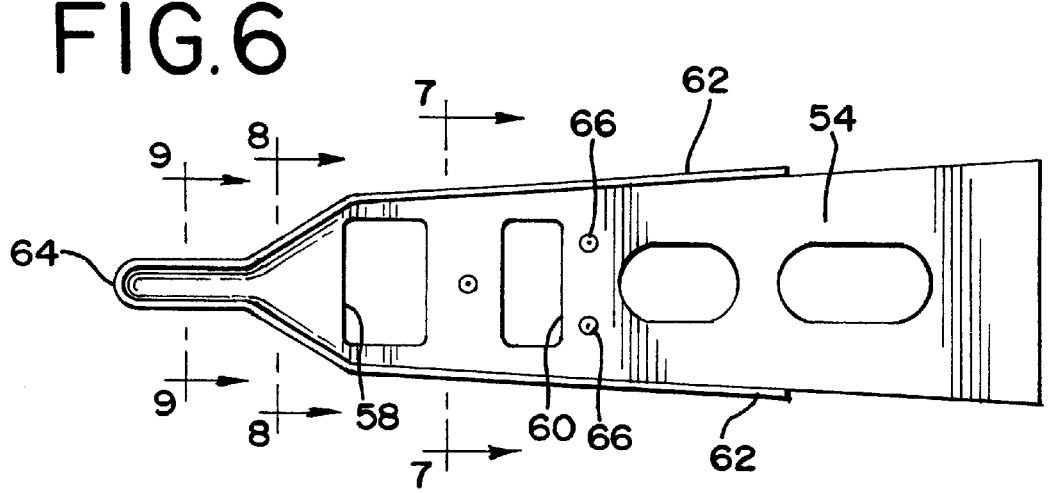
FIG. 6 is a top view of a reinforcing plate of the present invention.

A pair of through holes 66 are formed in the reinforcing plate 54 (best shown in FIGS. 4 and 6). The through holes 66 are used as the positioning holes or references when the head slider 28 is loaded on the slider loader 50 of the gimbal 48.

Referring now to FIG. 10, the rectangular tip 64 is raised above the rest of the planar reinforcing plate 54 by a difference S based on the positional relationship with the ramp component 36 (best shown in FIG. 2). This difference S is preferably about 80 mm. Of course, this difference S may not be needed depending on the shape of the ramp component 36.

An MR wiring pattern and a coil wiring pattern (not shown) are formed by printing on the loading surface side of the load beam 30, that is, the back surface on which the head slider 28 is attached or loaded (see FIG. 4). These wiring patterns are primarily copper, and have gold vapor deposited on the nickel on the copper. A tab 70 depend from the side edge of the load beam. The terminal leads of the MR wiring pattern and the coil wiring pattern are formed on this tab 70. Aluminum spacers 74 are spot welded to the base end of the load beam 30.

A plurality of holes 72 (best shown in FIG. 4) are preferably formed in the base of the gimbal 48 which is widened to increase the rigidity in the surface of the gimbal 48. The plurality of holes 72 decrease the pitch rigidity and the roll rigidity of the gimbal 48.

In the head assembly 26 of this embodiment, the slider pressing load is no more than 1 gf in the state where the head slider 28 is loaded onto the disk 8. Because the pressing load is small, frictional force between the rectangular tip 64 and the ramp component 36 when the rectangular tip 64 slides on the ramp component 36 becomes smaller. As a result, the abrasion resistance of the ramp component 36 improves, and smooth motion can be provided when loading and unloading.

Since the reinforcing plate 54 is joined to the rigid part 30b of the load beam 30, the rigidity of the rigid part 30b becomes extremely large. As a result, the torsional rigidity becomes much larger than when the rigid part of the load beam is formed by ribs alone as in the conventional manner. Thus, torsion which is a problem during the seeking operation of the head is prevented, and the resonant frequency of the load beam is increased. The tip of the pivot 56 formed in the reinforcing plate 54 press against the back surface of the slider loader 50, and supports the magnetic head slider 28. Thus, the head slider 28 can pitch and roll freely with the vertex of the pivot 56 as the fulcrum.

Providing the first and second openings 60, 58 (on the air inlet end and the air outlet end of the slider 28, respectively, with the intervening pivot 56 improves the slider loading characteristics. When the terminal leads of the wiring pattern of the load beam 30 are connected to the terminal leads of the magnetic head element formed on the slider 28, the head slider 28 and the slider loader 50 of the gimbal 48 must be supported by a large force. If the air inlet end and the air outlet end of the slider 28 can be supported as in the described embodiment, the slider 28 can be stably supported. In addition, the quality of the terminal lead connections is improved, and the accuracy in loading the slider 28 improves.

In an alternate embodiment, a damper material is provided between the load beam 30 and the reinforcing plate 54. The damper material can decrease the magnitude of the resonant frequency during a seek operation and improve the accuracy in positioning the magnetic head slider 28. If an adhesive material is used as the damper material, it can also function to join the reinforcing plate 54 to the load beam 30. Thus, assembling the head assembly 26 becomes simpler.

While the principles of the invention have been described above in connection with specific apparatus and applications, it is to be understood that this description is made only by way of example and not as a limitation on the scope of the invention.

Various features of the present invention are set forth in the following claims.

What is claimed is:

1. A head suspension for supporting a head slider comprising:

a substantially planar load beam;

a gimbal extending from and formed integrally with said load beam;

a slider loader formed on said gimbal, said slider loader being adapted and configured to have the head slider attached thereto; and a substantially rigid reinforcing plate cooperatively attached to said load beam;

wherein said slider loader includes a hook, said hook being adapted and configured to engage an edge of a first opening formed on said reinforcing plate to prevent said slider loader from being permanently deformed.

2. The head suspension according to claim 1, wherein said reinforcing plate has a pivot adapted and configured to support said slider loader, and has said first opening and at least one second opening formed adjacent said pivot in a lengthwise direction of said reinforcing plate.

3. The head suspension according to claim 1, wherein said reinforcing plate has at least one positioning hole as a reference for loading said head slider onto said slider loader.

4. The head suspension according to claim 1, wherein said reinforcing plate has a rib formed integrally on both sides of said reinforcing plate, and a generally rectangular tip formed integrally on a front end of said reinforcing plate and seamlessly connected to said ribs.

5. The head suspension according to claim 1, wherein said reinforcing plate has a thickness that is approximately 1.3 to 1.5 times a thickness of said load beam.

6. The head suspension according to claim 5, wherein thickness of said load beam is approximately 22 $\mu$m.

7. A head assembly comprising:

a substantially planar load beam;

a gimbal extending from and formed integrally with said load beam, said gimbal having a slider loader;

a reinforcing plate cooperatively attached to said load beam; and a head slider fixedly attached to said slider loader;

wherein said slider loader includes a hook, said hook being adapted and configured to engage an edge of a first opening formed on said reinforcing plate to prevent said slider loader from being permanently deformed.

8. The head assembly according to claim 7, wherein said reinforcing plate has a pivot adapted and configured to support said slider loader, and said first opening and a second opening formed adjacent said pivot in a lengthwise direction of said reinforcing plate.

9. The head assembly according to claim 7, wherein said reinforcing plate has at least one positioning hole as a reference for loading said head slider onto said slider loader.

10. A disk apparatus comprising:

a housing;

a head assembly provided in said housing and having a head element for reading and writing data on a disk having a plurality of tracks, and an actuator for moving said head assembly over said tracks;

wherein said head assembly further includes, a substantially planar load beam, a gimbal extending from and formed integrally with said load beam and having a slider loader, a reinforcing plate cooperatively attached to said load beam, and a head slider fixedly attached to said slider loader, wherein said slider loader includes a hook, said hook being adapted and configured to engage an edge of a first opening formed on said reinforcing plate to prevent said slider loader from being permanently deformed when said slider is being unloaded from said disk.

11. The disk apparatus according to claim 10, wherein said reinforcing plate has a pivot adapted and configured to support said slider loader and has first and second openings formed adjacent said pivot in a lengthwise direction of said reinforcing plate.

12. The disk apparatus according to claim 10, wherein said reinforcing plate has at least one positioning hole as a reference for loading said head slider onto said slider loader.

* * * * *